(12) United States Patent
Ito (10) Patent No.: US 6,801,504 B1
(45) Date of Patent: Oct. 5, 2004

(54) NODE DEVICE OF ATM COMMUNICATION NETWORK AND METHOD OF FAILURE ALARM NOTIFICATION

(75) Inventor: Toshihiko Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/316,034

(22) Filed: May 21, 1999

(30) Foreign Application Priority Data

May 6, 1998 (JP) .......................................... 10-172106

(51) Int. Cl.⁷ ................................................ H04L 1/00
(52) U.S. Cl. ...................... 370/242; 370/216; 370/246; 370/395.2; 370/401
(58) Field of Search ................................ 370/216, 218, 370/242, 243, 244, 245, 248, 250, 395.1, 395.2, 397, 399, 400, 401, 402, 246, 249, 241.1

(56) References Cited

U.S. PATENT DOCUMENTS

| | | | | |
|---|---|---|---|---|
| 5,461,607 A | * | 10/1995 | Miyagi et al. | 370/16 |
| 5,627,821 A | * | 5/1997 | Miyagi | 370/248 |
| 5,790,525 A | * | 8/1998 | Ono et al. | 370/244 |
| 5,974,045 A | * | 10/1999 | Ohkura et al. | 370/395 |
| 6,115,753 A | * | 9/2000 | Joens | 709/242 |
| 6,198,726 B1 | * | 3/2001 | Hayami et al. | 370/236 |

FOREIGN PATENT DOCUMENTS

| | | | |
|---|---|---|---|
| JP | 2/4071 | 1/1990 | H04L/12/56 |
| JP | 4-185033 | 7/1992 | H04L/12/56 |
| JP | 5-252190 | 9/1993 | H04L/12/48 |
| JP | 6-338898 | 12/1994 | H04L/12/48 |
| JP | 7/202897 | 8/1995 | H04L/12/28 |
| JP | 8-237256 | 9/1996 | H04L/12/28 |
| JP | 9-18485 | 1/1997 | H04L/12/28 |
| JP | 9-149097 | 6/1997 | H04L/29/14 |
| JP | 9-191312 | 7/1997 | H04L/12/28 |
| JP | 10-308741 | 11/1998 | H04L/12/28 |

OTHER PUBLICATIONS

Japanese Office Action, dated May 30, 2000, with English language translation of Japanese Examiner's comments.
Japanese Office Action, dated Mar. 7, 2000, with English language translation of Japanese Examiner's comments.
"ITU-T White Book Report I Series (B-ISDN)," Shin Nippon ITU Association, Oct. 28, 1993, pp. 345-352.

* cited by examiner

Primary Examiner—Dang Ton
Assistant Examiner—Shick Hom
(74) Attorney, Agent, or Firm—Whitham, Curtis & Christofferson, P.C.

(57) ABSTRACT

A node device in an ATM communication network is provided which is capable of generating a cell for creating a failure alarm rapidly so as not to apply a load to a processor. The node device copies header data from an ATM cell, and uses the copied header data to generate a failure alarm cell (e.g., an Alarm Indication Signal (AIS)). The node device obtains a VPI (Virtual Path Identifier) or VPI/VCI (VPI/Virtual Connection Identifier) for the failure alarm notification cell from a header of the cell on the VP (Virtual Path) which forms the pair of the failed VP. Accordingly, the processor does not need to process data from a header conversion table.

6 Claims, 6 Drawing Sheets

NODE DEVICE OF ATM COMMUNICATION NETWORK AND METHOD OF FAILURE ALARM NOTIFICATION

BACKGROUND OF THE INVENTION

1. Field of the Invention

The present invention relates to a node device of an ATM (Asynchronous Transfer Mode) communication network and a method of a failure alarm notification.

This invention is based on Patent Application No. Hei 10-172106 filed in Japan, the content of which is incorporated herein by reference.

2. Background Art

Specifications for an OAM (Operation, Administration, and Maintenance) processing is generally used in an ATM communication network for an ATM level failure alarm notification, and the processing steps are provided in ITU-T Rec.I610 "B-ISDN Operation and Maintenance Principals and Function".

Figure 1:
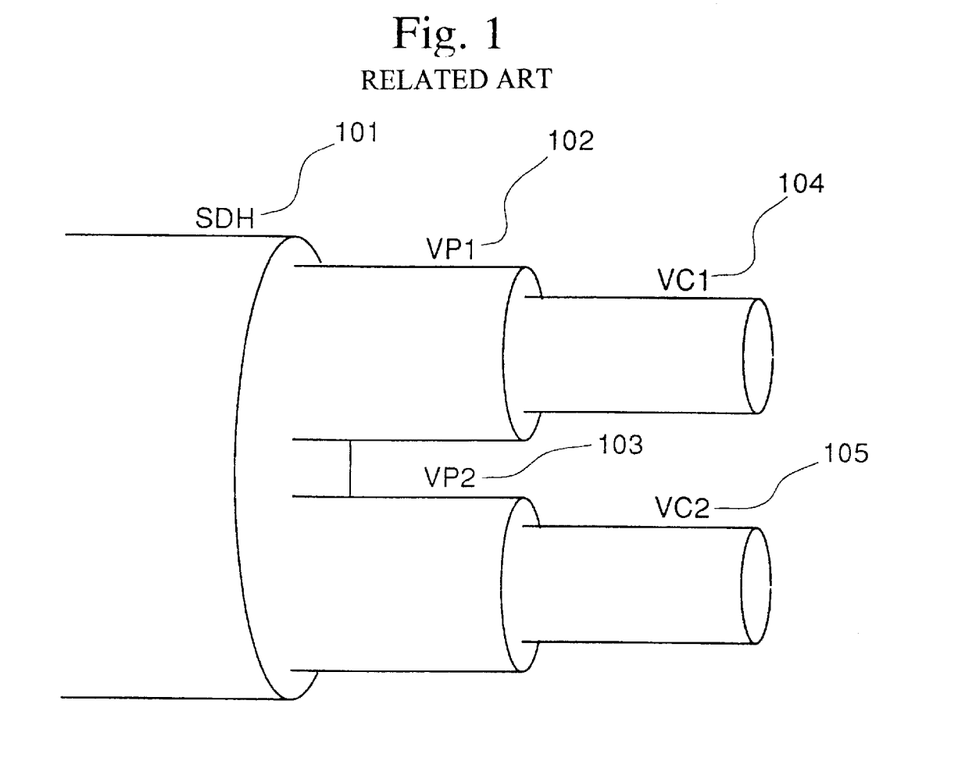
FIG. 1 is a schematic diagram showing the structure of VP and VC to which the present invention is applied.

FIG. 1 is a schematic diagram showing a relationship between the lines of the ATM communication network and the connections. In the figure, the reference numeral 101 indicates a SDH (Synchronous Digital Hierarchy) line, 102 and 103 indicate VP1 (first virtual path) and VP2 (second virtual path), respectively, which are both multiplexed with the SDH 101, and 104 and 105 indicate connections VC1 (first Virtual connection) and VC2 (second Virtual Connection), respectively, which are multiplexed with VP1 and VP2, respectively.

When a failure occurs in the SDH line 101, a VP-AIS (Alarm Indication Signal) is sent downstream to respective VPs which are multiplexed with the SDH 101. At the end point of the VPC (Virtual Path Connection), the VC-AIS is sent downstream to each VC (Virtual Connection), which is multiplexed with each VP.

Referring to FIG. 1, when a failure occurs in the SDH line 101, the VP-AIS is sent to VP1 102 and VP2 103, respectively, which are multiplexed with SDH 101.

At the end point of the VPC, the VC-AIS is sent to VC1 104 and VC2 105, respectively, which are multiplexed with VP1 102 and VP2 103.

At the end point of VPC, the VP-AIS is terminated, and the VP-RDI (Remote Defect Indication) is sent to the end point of the opposite VP.

Similarly, the VC-AIS is terminated at the end point of VCC, and the VC-RDI is sent to the end point of the opposing VC.

Figure 2:
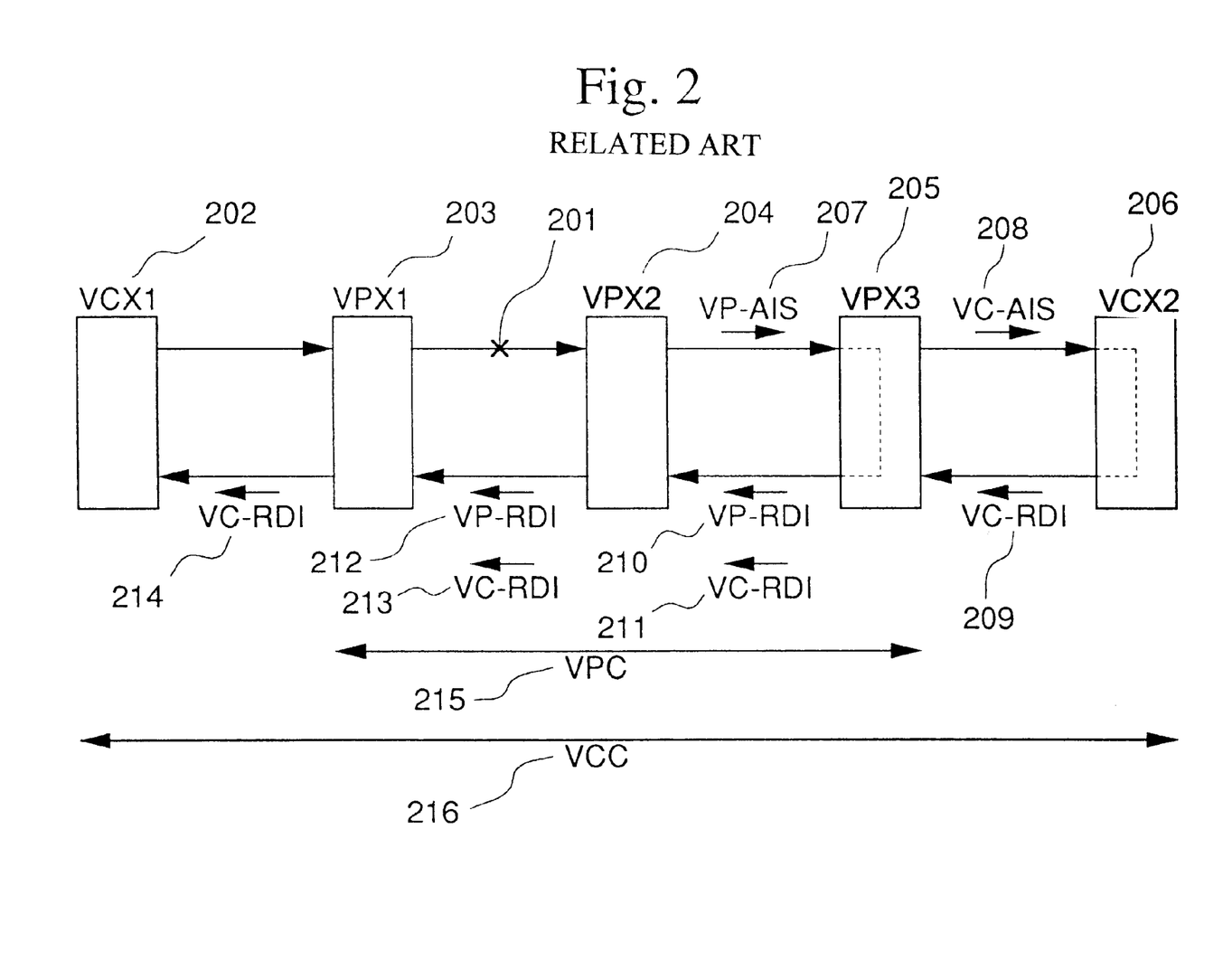
FIG. 2 is a block diagram showing transmission of the failure alarm notification cell in the line to which the present invention is applied.

FIG. 2 is a block diagram showing VCs (Virtual Connection) from the sending side VC user to the receiving side VC user. The reference numeral 202 indicates the sending side VC user, VCX1; 203 indicates a sending side node, VPX1; 204 indicates a relay node, VPX2; 205 indicates a receiving side node, VPX 3; and 206 indicates a receiving side VC user, VCX2. A virtual connection VCC 216 connects from the sending side VC user, VCX1 202, to the receiving side VC user VCX2 206, and the virtual connection 216 is multiplexed with the virtual path VPC215 in between the sending side node VPX1 203 and the receiving side node VPX3 205.

Hereinafter, a case will be described when a failure 201 occurs at a position in a VP indicated by a mark X, which is located between the node VPX1 203 and the node VPX2 204, as shown in FIG. 2.

When the failure is detected at the relay node VPX2 204 located downstream from the position of the failure, the relay node VPX2 204 sends a signal VP-AIS 207 down stream from the node. Since the receiving side node VPX3 205 that has received VP-AIS 207 is the end point of the VPC 215 in which the failure occured, the VP-AIS 207 is terminated at the node 205 and VP-RDI 210 is sent upstream to the opposite VP which forms a pair with the VP in which the failure occured. The receiving side node VPX3 205 sends VC-AIS 208 down stream to the VC which is multiplexed with the failed VP for notifying the failure alarm.

The receiving side VC user VCX2 206, which is multiplexed with the failed VP and which is the end point of the VC, terminates the received VC-AIS 208, and sends VC-RDI 209 upstream from the device to another VC which forms a pair of the VC which received the failure signal. The VPX3 205, VPX2 204, and VPX1 203 send VC-RDI 209 as it is supplied from the VCX2 206 to the VCX1 202 upstream.

Since VPX1 203 is the end point of the VPC 215, the VPX1 203 terminates the VP-RDI 212 sent from the VPX3 205. By receiving and terminating the VP-RDI 212, the VPX1 203 can recognize the position of the failure marked by X.

Since VCX1 202 is the end point of VCC 216, it receives and terminates VC-RDI 214 sent from the VCX2 206.

Figure 3:
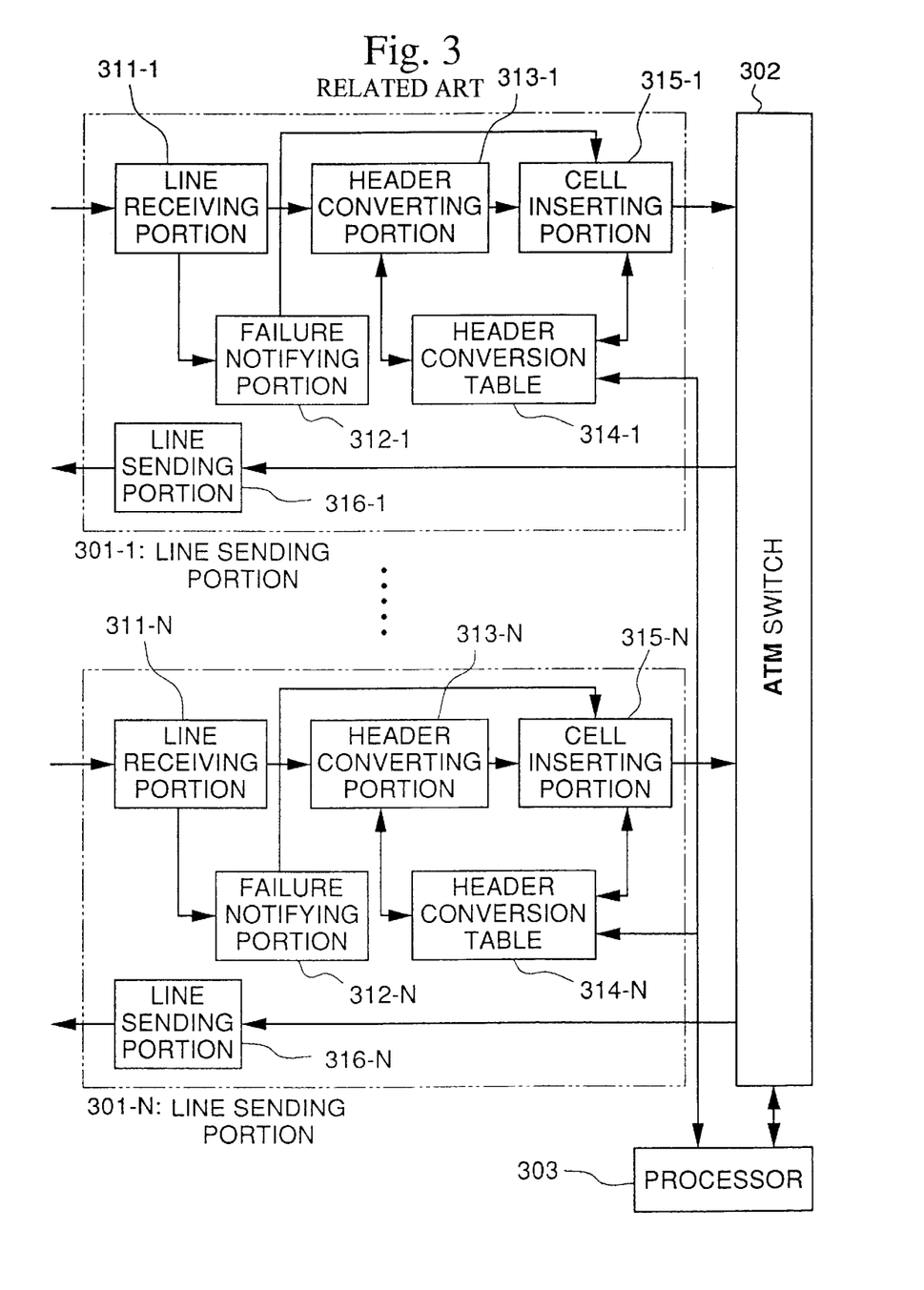
FIG. 3 is a block diagram showing the structure of the relay node of the conventional apparatus.
Figure 4:
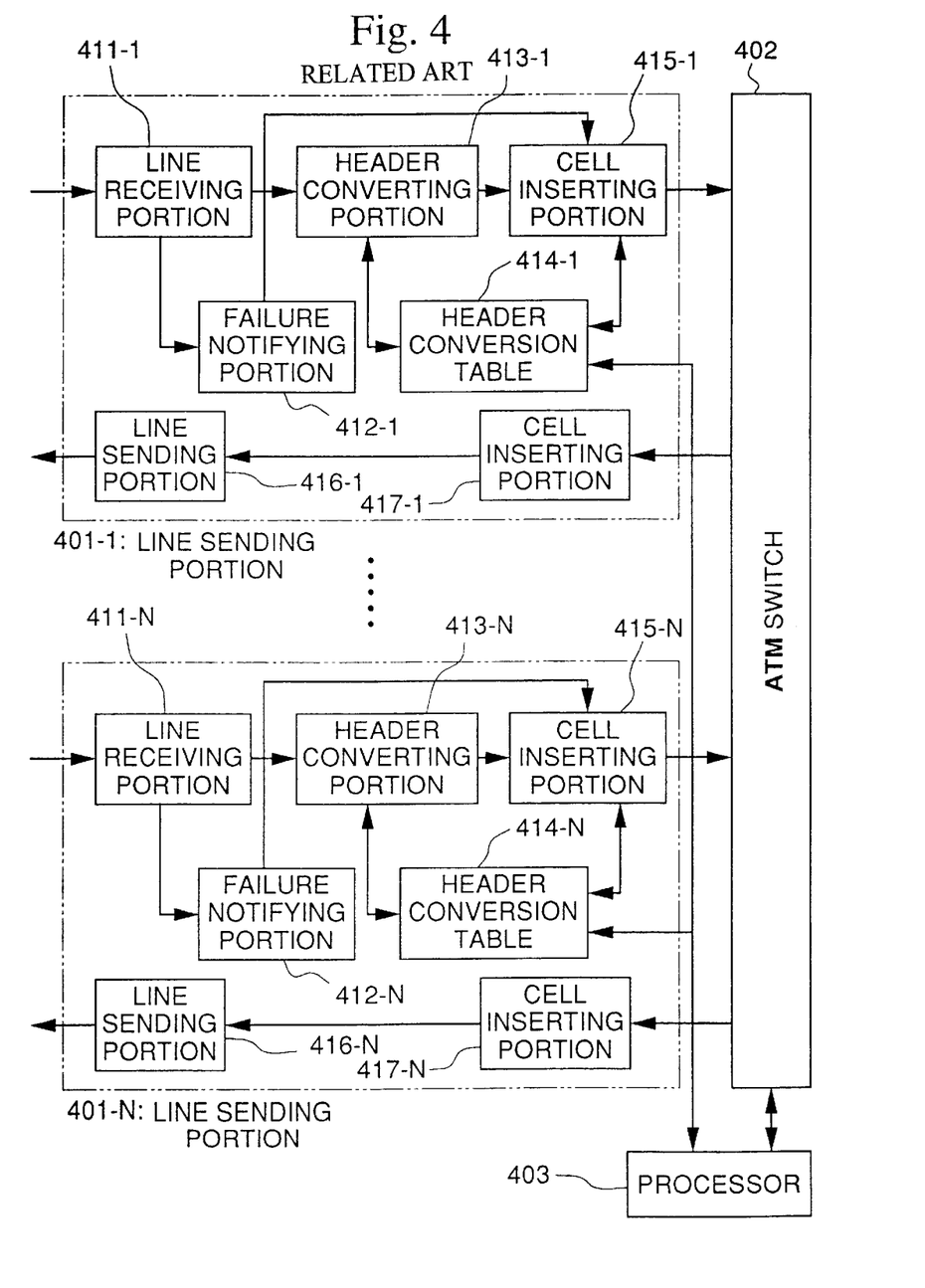
FIG. 4 is a block diagram showing the structure of the receiving side node of the conventional apparatus.

In order to carry out the above described processing, respective nodes shown in FIG. 2 are constructed as shown in FIG. 3 or in FIG. 4.

FIG. 3 is a diagram showing structures of the relay nodes VPX2 204 in FIG. 2, which is comprised of line processing interfaces (301-1, 301-2, ..., 301-k, 301-N, only 301-1 and 301-n are shown in the figure), provided for respective lines (numbers of lines are 1, 2, ..., k, ..., N), an ATM switch 302, and a processor 303.

The line processing interfaces for respective lines are the same and a line processing interface 301-1 will be described. The line processing interface 301-1 is provided with a line receiving portion 311-1 which terminates the line, a failure notifying portion 312-1 for notifying that the failure in a line has been detected, a header converting portion 313-1 for converting a header of received data (cell), a header conversion table 314-1, which stores notifications for replacing the header, and which is referred to by the header converting portion, a cell inserting portion 315-1 for inserting a cell to communicate the failure notice, and a line sending portion 316-1.

When the line receiving portion 311-1 of the line processing interface 301-1 detects an LOS (Loss Of Signal), the failure notice portion 312-1 is informed about this detection, and the cell insertion portion 315-1 prepares for inserting the VP-AIS cell.

An address of the VP-AIS cell is determined by the header conversion portion 313-1, and the address is added to the header of the VP-AIS cell as VPIs (VP identifiers). The VP-AIS cell, to which the address is added, is input into the ATM switch 302 from the cell inserting portion 315-1.

FIG. 4 is a block diagram showing the structure of a node which is the end point of the VPC, such as the receiving side node VPX3 205 shown in FIG. 2, and which is comprised of line processing interfaces 401-1, 402-1, ..., 401-k, ..., 401-N provided for respective lines 1, 2, ..., k, ..., N, an ATM switch 402, and a processor 403.

Since the line processing interfaces for respective lines have the same structure, the structure of the line processing interface is explained using the first line processing interface 401-1. The first line processing interface 401-1 comprises the line receiving portion 411-1 which terminates the line, a failure notifying portion 412-1 for notifying that a failure has been detected in a line, a header converting portion 413-1 which renews the header of the received data (cell), a header conversion table 414-1 which stores data for renewing data and which is referred by the header converting portion 413-1, an upstream cell inserting portion 415-1 for inserting a cell for communicating the failure notice, a cell inserting portion 416-1, and a line transmitting portion 417-1.

When the LOS is detected at the line receiving portion 411-1 of the line processing interface 401-1, the detected signal is communicated to the failure notifying portion 412-1, and the cell inserting portion 412-1 prepares for inserting the VC-AIS cell as the end-point of the VP in response to an instruction from the failure notifying portion 412-1.

The address of the VC-AIS cell is determined by the header converting portion 413-1 and the result is added to the header of the VC-AIS as the VPI/VCI (VP Identifier/VC Identifier).

The VC-AIS to which the address has been added is input to an ATM switch 402 from the cell inserting portion 415-1.

Since this node is the end point of the VP, a preparation for inserting the VP-RDI cell is performed by the cell inserting portion 417-1.

The VP-RDI, to which the address is added, is sent to a VP, which forms a pair with the other VP in the upper stream by the line sending portion 416-1.

As described above, in the conventional node device in an ATM communication network, in order to add address information VPI or the VPI/VCI to the AIS or RDI cell which is the failure alarm signal, similar to the case of adding the VPI or the VPI/VCI to the usual OAM cell, the header converting portion 313-1 or 413-1 determines and add address information with reference to the header conversion table 314-1 or 414-1.

However, the problems are encountered that it takes a considerable time to refer to the header conversion table by normal software and the load for the processor is great when carrying out the operation of the software.

That is, it may be assumed that the processor for referring to the header conversion table 314-1 or 414-1 is included in the header converting portion 313-1 or 413-1, or that the header conversion table 314-1 or 414-1 is referred to by software which is operated by the processor 303 or 403. However, in either case, the problems remain that the load for the processor is quite large, and the reference operation takes a long time.

The object of the present invention is to provide a node device which, when a failure occurs upstream of the ATM communication network, can send the failure alarm notification quickly downstream from the ATM communication network, and to provide a method of the failure alarm notification by use of the present node device.

SUMMARY OF THE INVENTION

Each line processing interface constituting a node in an ATM communication network is composed of a pair of interfaces for up and down paths. Thus, when a failure occurs in, for example, the down path, and when the VP-AIS cell is sent by said line processing interface downstream, it is possible to use the VPI which is extracted from the cell header in the up path input in said line processing interface. Extraction of the VPI can be carried out by simple hardware; thereby, the VPI can be obtained more rapidly than the determination with reference to the header conversion table, and the load to the processor can be reduced.

According to the present invention, a node device in the ATM (Asynchronous Transfer Mode) network comprises:

line processing interfaces provided for respective lines of said ATM network;

ATM switches to which VPs (Virtual Path) output from said line processing interfaces are connected and to which VPs input to said line processing interfaces are connected; and a processor for controlling said ATM switches and all of said line processing interfaces; and said line processing interface comprises:

a line receiving portion for receiving an ATM cell from upstream of line;

a failure notification portion for communicating the failure of said VP when the failure is detected at said line receiving portion by interruption of the upstream ATM cell;

a cell extracting/generating portion for making a copy of the ATM cell which is input from said ATM switch to said line processing interface according to an instruction from said failure notification portion, when the failure of said VP is detected, and for generating the failure alarm signal cell using the copied data of the header of the cell;

a cell inserting portion for transferring the failure alarm signal cell generated at the cell extracting/generating portion to said ATM switch; and a line sending portion for sending the cell input from said ATM switch to said upstream cell extracting/generating portion from the line processing interface.

In the node device of the present invention, said cell extracting/generating portion comprises:

a determination portion for determining the instruction from said failure notification portion;

a timer which is started by the determination portion, when the determination portion determines that said failure of the VP is notified;

a cell copying portion, which is started by the determination portion, when the determination portion determines that said VP failure notification is communicated for making a copy of the cell input from said ATM switch to said line processing interface;

a VPI extracting portion for extracting a VPI (VP identifier) from said cell copied at said cell copying portion; and an AIS (Alarm Indication Signal) generating portion for generating the AIS cell, having the VPI extracted at the VPI extracting portion written at the header, for transferring said AIS to said cell inserting portion.

In the node device of the present invention, said determination portion activates said timer from the time when said determination portion receives the failure notification from said failure notification portion until the time when said determination portion receives the failure restoration notification, and said AIS cell generating portion generates AIS cell in the timing determined by said timer while the timer is operating.

In the node device of the present invention, said cell extracting/generating portion comprises:

a determination portion for determining the instruction from said failure notification portion;

a timer which is activated by said determination portion, when the determining potion determines that the failure of said VP is communicated;

a cell copying portion, that is started by the determination portion, when the determination portion determines that the failure of said VP is communicated, for making a copy of the cell input from said ATM switch to said line processing interface;

a VPI/VCI extracting portion for extracting the VPI/VCI (VCI is a VC identifier) from the cell copied by the cell copying portion;

an AIS generating portion for generating an AIS cell, having the VPI/VCI extracted at the VPI/VCI extracting portion written at the header, for transferring said AIS to said cell inserting portion;

an RDI generating portion for generating an RDI (Remote Defect Indication) cell, having a VPI extracted at said VPI/VCI extracting portion written at the header; and an RDI cell inserting portion for transferring said RDI cell to said line sending portion.

Furthermore, said determination portion activates said timer from the time when said determination portion receives the failure notification from said failure notification portion until the time when said determination portion receives the failure recovery notification, and said AIS cell generating portion and said RDI generating portion generate said AIS cell and RDI cell, respectively, in the timing determined by said timer while the timer is operating.

According to the present invention, a method of the failure alarm notification comprises the steps of:

detecting a failure originating upstream from said VP by the line receiving portion of the line processing interface; and transmitting a AIS cell downstream from said VP after generating said AIS cell having a VPI, which is the same VPI transmitting on the VP forming a pair with the failed VP.

The method of communicating the failure alarm comprises the steps of:

detecting a failure that has occurred upstream from a VP by the line receiving portion of the line processing interface;

transmitting an AIS cell downstream to said VP concerned after generating said AIS cell having a VPI/VCI, which is the same VPI/VCI transmitted on the VP forming a pair with the failed VP;

transmitting an RDI cell downstream from said VP after generating said RDI cell having a VPI, which is the same VPI transmitting on the VP forming a pair with the failed VP.

DETAILED DESCRIPTION OF THE PREFERRED EMBODIMENT

Hereinafter, an embodiment of the present invention will be described with reference to the attached drawings.

Figure 5:
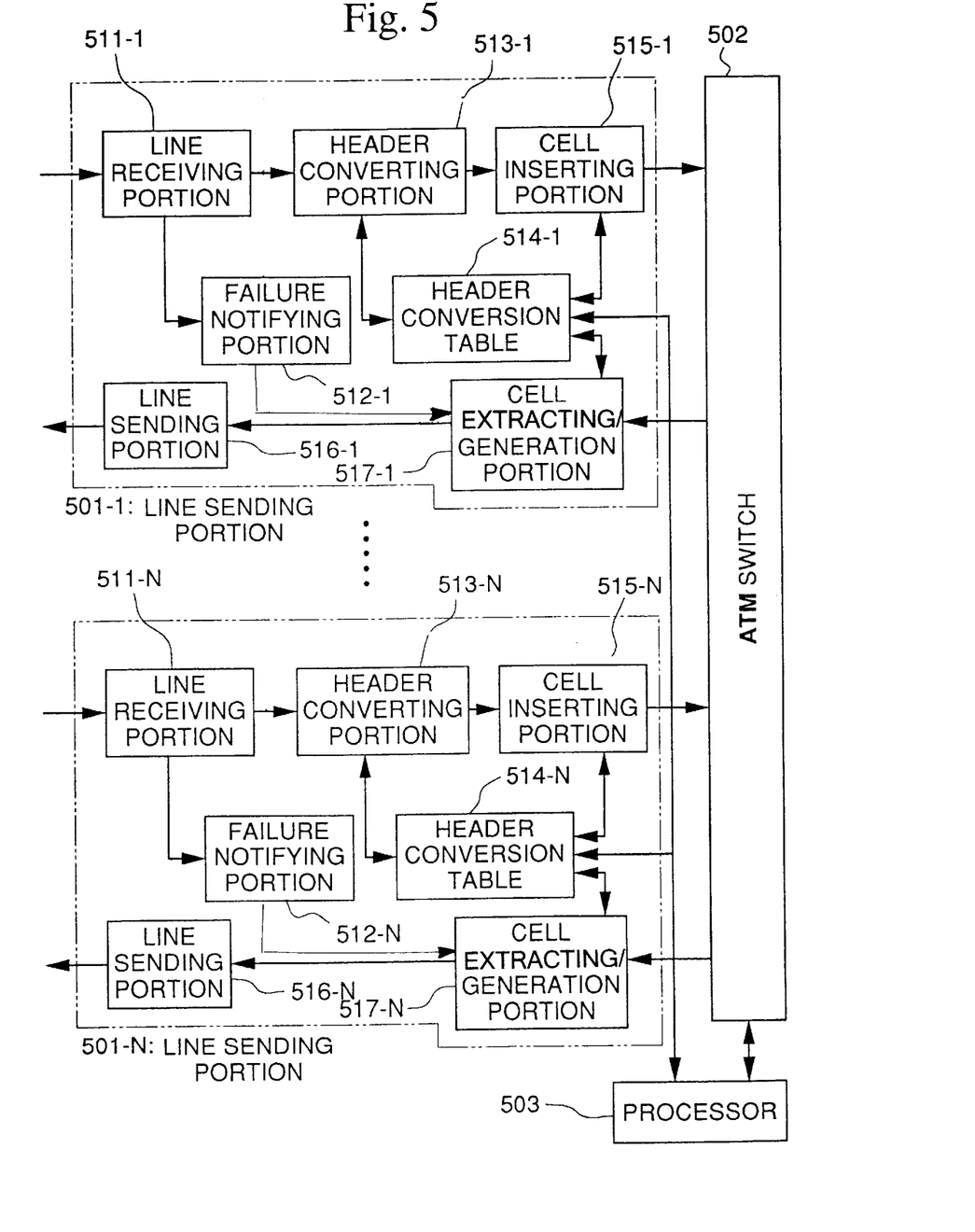
FIG. 5 is a block diagram showing the node device of the present invention.

FIG. 5 is a block diagram showing the node device of the present invention. Referring to FIG. 5, reference numerals 502 and 503 are the same elements as the ATM switches 302 and 303, so that explanation of those elements are omitted.

Reference numerals 511-1 (or 511-N), 512-1 (or 512-N), 513-1 (513-N), 515-1 (515-N), and 516-N (515-N) are almost the same as the line receiving portion 311-1, the failure notification portion 312-1, the header converting portion 313-1, the header conversion table 314-1, the cell inserting table 315-1, the line transmitting portion 316-1, shown in FIG. 3, respectively, so that the explanations of those elements are omitted except differences.

The main difference between the line processing interface 501-1 (501-N) shown in FIG. 5 and the line processing interface 301-1 (301-N) shown in FIG. 3 is that the line processing interface 501-1 (501-N) in FIG. 5 is provided with a cell extracting/generating portion 517-1 (517-N).

In addition, as shown in FIG. 5, the output of the failure notification portion 512-1 (512-N) is input, not to the cell inserting portion 515-1 (515-N), but to the cell extracting/generating portion 517-1 (517-N).

The cell extracting/generating portion 517-1 makes a copy of a line cell which forms the pair of the line where the failure occurs, and generates a cell for communicating the failure, by the use of VPI (or VPI/VCI) of the header of the line cell. This cell for communicating the failure is multiplexed with the usual user data cell at the cell inserting portion 515-1 (515-N).

Figure 6:
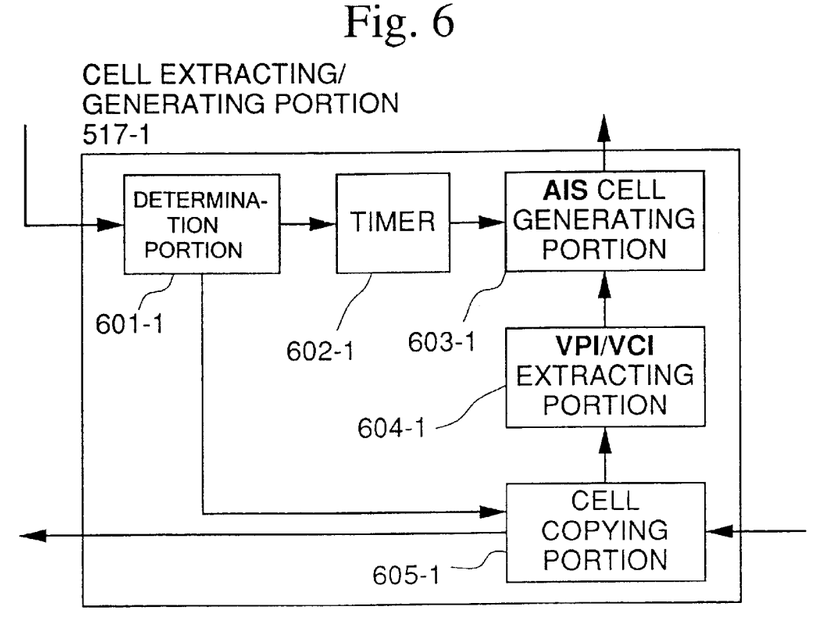
FIG. 6 is a block diagram showing the structure of the cell extracting/generating portions in the relay node device shown in FIG. 5.

FIG. 6 is a block diagram showing the structure of the cell extracting/generating portion, which comprises a determination portion 601-1, a timer 602-1, a AIS cell generating portion 603-1, a VPI extracting portion 604-1, and a cell copying portion 605-1. The determination portion 601-1 determines the failure notification from the failure notifying portion 512-1 and the timer 602-1 determines the timing to transmit the VP-AIS which is set forth in ITU-TI.610.

The cell copying portion 605-1 makes a copy of the cell transmitted upstream from the line processing interface 501-1. The VPI extracting portion 604-1 extracts the VPI in the header of the copied cell, and the AIS cell generating portion 603-1 generates the AIS cell according to the timing signal from the timer 602-1 and transmits the AIS cell to the cell inserting portion 515-1, after the VPI extracted at the VPI extracting portion 604-1 is written in the header of the AIS cell.

Hereinafter, an operation of the line processing interface 501-1 is described.

In general, the data (cell) transmitted from the ATM communication network are processed at the line receiving portion 511-1 and, when necessary, the address of the processed data is updated by the header converting portion 513-1. That is, the VPI or VPI/VCI stored in the header of the cell is updated.

The header conversion table 514-1 is referred to when updated. The content of the header conversion table 514-1 is updated by the processor 503, when necessary.

The cell leaving the header converting portion 513-1 is input into the ATM switch 502 through the cell inserting portion 515-1.

In contrast, the data (cell) input from the ATM switch 502 to the line processing interface 501-1 is transmitted upstream through the cell extracting/generating portion 517-1 and the line transmitting portion 516-1.

If a failure occurs upstream from the ATM communication network, the line receiving portion cannot receive the data, an interruption of the receiving signal is detected, and this interruption of the signal is communicated to the failure notification portion 512-1. The failure notification portion 512-1 notifies the cell extracting/generating portion 517-1 that the failure of the line is detected.

When the notification signal that a line failure has been detected is determined at the determination portion 601-1 of the cell extracting/generating portion 517-1, the determination portion 601-1 instructs the cell copying portion 605-1 to make a copy of the cell on the line which forms a pair with a line where the failure has occurred.

The copied cell is transmitted to the VPI extracting portion 604-1, and only the VPI written in the header of the cell is extracted. The extracted VPI is sent to the AIS cell generating portion 603-1 and is written in the header of the VP-AIS. The VP-AIS cell generated at the AIS cell generating portion is sent to the cell inserting portion 515-1, and is transferred to the ATM switch 502 from the cell inserting portion 515-1.

The VP-AIS cell is transferred to the cell inserting portion 515-1 at an interval designated by the ITU-TI.610 until the failure notification 512-1 notifies the recovery from the failure to the determination portion 601-1. The above interval is controlled by the timer 602-1.

Once the failure notification portion 512-1 notifies the determination portion 601-1 about the recovery of the failure, the determining potion 601-1 instructs the cell copying portion 605-1 to terminate copying operation of the cell, and also instructs it to stop the timer 602-1.

The cell extracting/generating portion 517-1 shown in FIG. 6 is a cell extracting/generating portion 517-1 of the line processing interface 501-1 of the relay node such as the node VPX2 204 shown in FIG. 2, and its structure differs from the structure of the cell extracting/generating portion 517-1 of the line processing interface 501-1 of the receiving side node, such as the VPX3 205 shown in FIG. 2.

Figure 7:
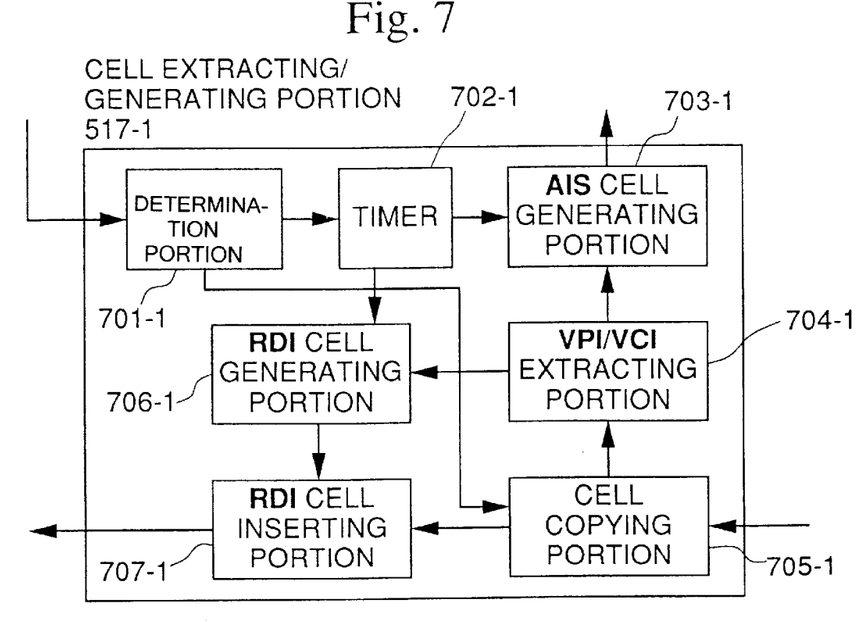
FIG. 7 is a block diagram showing the structure of the cell extracting and cell generating portions in the receiving side node device shown in FIG. 5.

FIG. 7 is a block diagram showing the structure of the cell extracting/generating portion 517-1 of the line processing interface 501-1 of the node VPX3 205 (receiving side) shown in FIG. 2.

Referring to FIG. 7, the reference numerals 701-1, 702-1, 703-1, 704-1, and 705-1 correspond to respective elements of 601-1, 602-1, 603-1, 604-1, and 605-1. However, the AIS signal from the node VPX3 205 is the VC-AIS cell, since it is sent to the receiving side terminal VCX2 206 (receiving side VC user). Thus, the VPI/VCI extracting portion 704 extracts the VPI/VCI from the header of the cell, and the extracted VPI/VCI is written in the AIS cell at the AIS cell generating portion 703-1.

The cell extracting/generating portion 517-1 shown in FIG. 7 comprises a RDI cell generating portion 706-1 and a RDI cell inserting portion 707-1 for sending the RDI cell upstream.

Generation and transmission of the VC-AIS cell at the cell extracting/generating portion 517-1 are performed similar to generation and transmission of the VP-AIS cell at the cell extracting/generating portion 517-1 shown in FIG. 6, and the VC-AIS cell is transferred from the cell inserting portion 515-1 to the receiving side user VCX2 206 through the ATM switch 502.

The VPI extracted at the VPI/VCI extracting portion 704-1 shown in FIG. 7 is sent to the RDI generating portion 706-1, and the VPI is written in the header of the VP-RDI cell which is generated at this portion 706-1. The VP-RDI cell generated at the RDI generating portion 706-1 is transmitted to the line from the RDI cell inserting portion 707-1.

The timings for starting and completing the transmission and for transmission of the RDI cell are controlled by the timer 702-1, similar to the timing for starting and finishing transmission and for the transmission of the VC-AIS cell.

As hereinabove described, according to the present invention, when a failure is detected, it becomes possible to execute the failure alarm notification very rapidly, since it is not necessary to refer to the header conversion table for determination of the addresses of the AIS and RDI cells.

In addition, since it is not necessary to refer to the header conversion table, the load to the processor is drastically reduced.

What is claimed is:

1. A node device in an Asynchronous Transfer Mode ATM network comprising:

line processing interfaces provided for respective lines of said ATM network;

an ATM switch to which Virtual Path VP output from said line processing interfaces are connected and from which VP input to said line processing interfaces are connected; and a processor for controlling said ATM switch and all of said line processing interfaces; and at least one of said line processing interfaces comprises:

a line receiving portion for receiving an ATM cell;

a failure notification portion for communicating a failure of a VP when the failure is detected at said line receiving portion by interruption of the ATM cell;

a cell extracting/generating portion for making a copy of the ATM cell which is input from said ATM switch to said at least one line processing interface according to an instruction from said failure notification portion, when the failure of said VP is detected, and for generating a failure alarm cell using copied data of a header of the ATM cell;

a cell inserting portion for transferring the failure alarm cell generated at the cell extracting/generating portion to said ATM switch; and a line sending portion for sending the cell input from said ATM switch to said cell extracting/generating portion from the at least one line processing interface.

2. The node device in the ATM network according to claim 1, wherein said cell extracting/generating portion comprises:

a determination portion for determining the instruction from said failure notification portion;

a timer which is started by the determination portion, when the determination portion determines that failure of said VP has been communicated;

a cell copying portion, that is started by the determination portion, when the determination portion determines that said failure of the VP is communicated, for making a copy of the cell input from said ATM switch to said at least one line processing interface;

a Virtual Path Identifier VPI extracting portion for extracting a VPI from said ATM cell copied at said cell copying portion; and an Alarm Indication Signal AIS cell generating portion for generating an AIS cell, having the VPI extracted at the VPI extracting portion written at the header for transferring said AIS cell to said cell inserting portion.

3. The node device in the ATM network according to claim 2, wherein said determination portion activates said timer from a time when said determination portion receives a VP failure notification from said failure notification portion until a time when said determination portion receives a failure restoration notification, and said AIS cell generating portion generates the AIS cell while the timer is operating.

4. The node device in the ATM network according to claim 1, wherein said cell extracting/generating portion comprises:

a determination portion for determining the instruction from said failure notification portion;

a timer which is activated by said determination portion, when the determination portion determines that the failure of said VP is communicated;

a cell copying portion, that is started by the determination portion, when the determination portion determines that the failure of said VP is communicated, for making a copy of the ATM cell input from said ATM switch to said at least one line processing interface;

a Virtual Path Identifier/Virtual Connection Identifier VPI/VCI extracting portion for extracting a VPI/VCI from the ATM cell copied by the cell copying portion;

an Alarm Indication Signal AIS cell generating portion for generating an AIS cell, having the VPI/VCI extracted at the VPI/VCI extracting portion written at a header, for transferring said AIS cell to said cell inserting portion;

a Remote Defect Indication RDI cell generating portion for generating an RDI cell, having a VPI extracted at said VPI/VCI extracting portion written at a header; and an RDI cell inserting portion for transferring said RDI cell to said line sending portion.

5. The node device in the ATM network according to claim 4, wherein said determination portion activates said timer from a time when said determination portion receives a failure notification from said failure notification portion until a time when said determination portion receives a failure restoration notification, and said AIS cell generating portion and said RDI cell generating portion generate said AIS cell and said RDI cell, respectively, while the timer is operating.

6. The node device in the Asynchronous Transfer Mode ATM network as recited in claim 1, wherein said output from said at least one line processing interface connected to said ATM switch provides signaling in a first direction and said input to said at least one line processing interface from said ATM switch provides signaling in a second direction.

* * * * *